United States Patent
Carlin et al.

(10) Patent No.: US 9,180,793 B2
(45) Date of Patent: Nov. 10, 2015

(54) MOVABLE SEATING ARRANGEMENT

(71) Applicants: Mark Carlin, Newtown, CT (US); Howard Velasco, Bristol, CT (US)

(72) Inventors: Mark Carlin, Newtown, CT (US); Howard Velasco, Bristol, CT (US)

(73) Assignee: Franklin Products, Inc., Torrington, CT (US)

(*) Notice: Subject to any disclaimer, the term of this patent is extended or adjusted under 35 U.S.C. 154(b) by 140 days.

(21) Appl. No.: 13/715,293

(22) Filed: Dec. 14, 2012

(65) Prior Publication Data
US 2013/0154325 A1    Jun. 20, 2013

Related U.S. Application Data

(60) Provisional application No. 61/577,920, filed on Dec. 20, 2011.

(51) Int. Cl.
*B60N 2/66* (2006.01)
*B60N 2/02* (2006.01)

(52) U.S. Cl.
CPC ............... *B60N 2/02* (2013.01); *B60N 2/0284* (2013.01); *B60N 2/66* (2013.01)

(58) Field of Classification Search
CPC .............................. B60N 2/0284; B60N 2/66
USPC ................... 297/284.4, 317, 337, 343
See application file for complete search history.

(56) References Cited

U.S. PATENT DOCUMENTS

| | | | |
|---|---|---|---|
| 202,856 A | 4/1878 | Morse | |
| 1,312,720 A | 8/1919 | Bostwick | |
| 3,640,570 A | 2/1972 | Karlsen | |
| 4,452,486 A * | 6/1984 | Zapf et al. | 297/343 |
| 5,171,062 A * | 12/1992 | Courtois | 297/340 |
| 5,988,749 A | 11/1999 | Williams | |
| 6,827,402 B2 | 12/2004 | Habermann et al. | |
| 6,935,690 B2 | 8/2005 | Lucci et al. | |
| 7,490,904 B2 * | 2/2009 | Hogg | 297/343 |
| 8,534,755 B2 * | 9/2013 | Nickerson | 297/219.1 |
| 2002/0175547 A1 | 11/2002 | Bentley | |
| 2003/0111888 A1 | 6/2003 | Brennan | |
| 2006/0061169 A1* | 3/2006 | Kohl et al. | 297/284.4 |
| 2006/0103211 A1 | 5/2006 | Garrido | |
| 2009/0021057 A1 | 1/2009 | Erb et al. | |
| 2011/0084530 A1* | 4/2011 | Lockwood et al. | 297/342 |
| 2011/0193386 A1 | 8/2011 | Gaither et al. | |

FOREIGN PATENT DOCUMENTS

WO    2005/095210 A1    10/2005

* cited by examiner

*Primary Examiner* — David R Dunn
*Assistant Examiner* — Jody Giacoman
(74) *Attorney, Agent, or Firm* — McCormick, Paulding & Huber LLP

(57) ABSTRACT

A movable seating arrangement includes a seat pan, a back support rigidly connected with the seat pan, and a seat member slidably mounted to the seat pan. The seat member can be moved from a retracted position proximate the back support to an extended position displaced forward of the upright position, without movement of the back support. In certain embodiments, a lumbar support is mounted to the back support, and motion of the seat member to its extended position causes a mid portion of the lumbar support to flex forward from a flattened position.

19 Claims, 6 Drawing Sheets

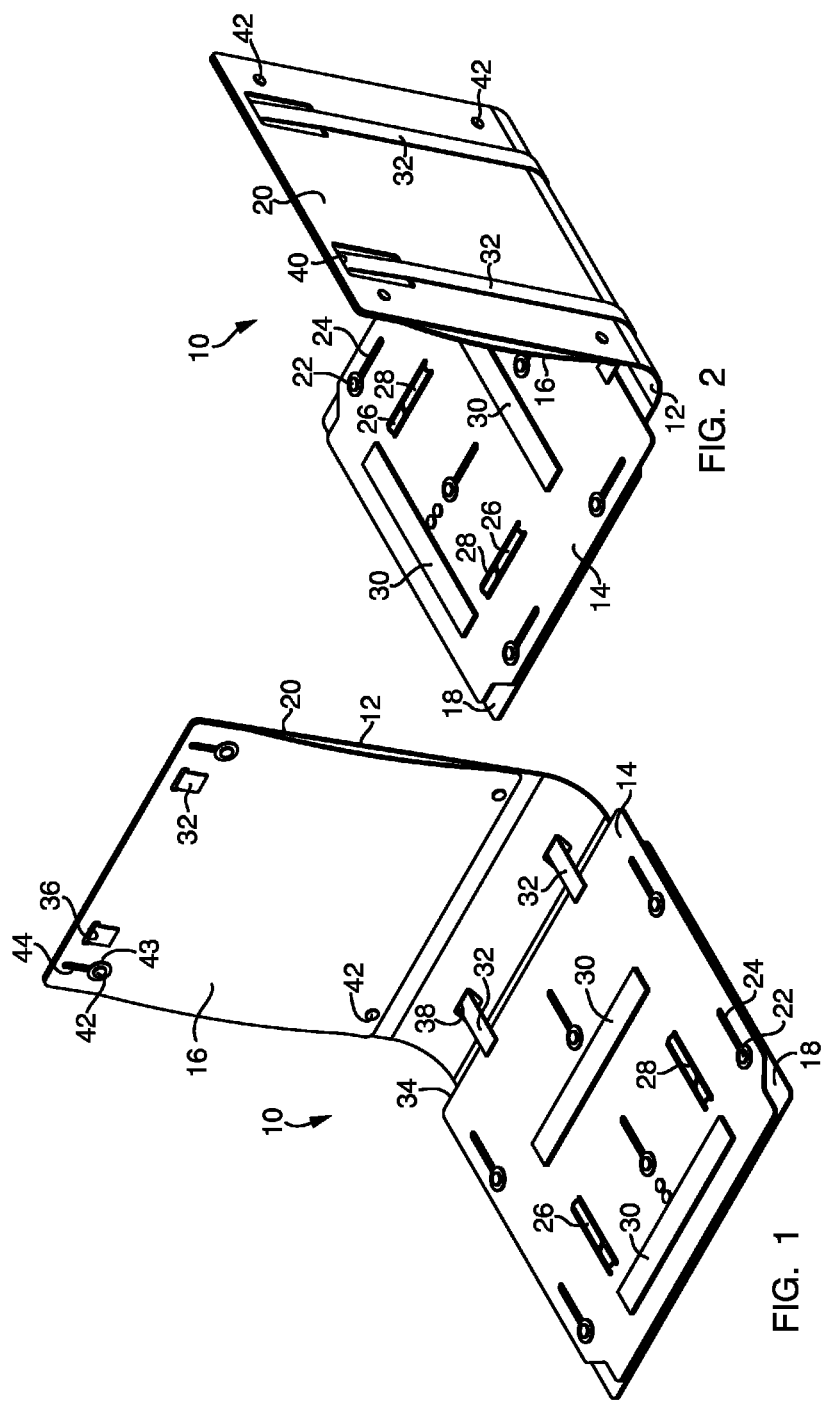

MOVABLE SEATING ARRANGEMENT

CROSS REFERENCE TO RELATED APPLICATIONS

The present application claims priority to U.S. App. No. 61/577,920 filed Dec. 20, 2011, and incorporates by reference the disclosures thereof.

BACKGROUND

1. Technical Field

The present invention relates to vehicular seating furniture.

2. Discussion of Art

In multi-passenger vehicles such as buses or airplanes, seating space is scarce and it is desirable to minimize the volume occupied by each passenger. Yet such vehicles tend to travel long distances between embarkations, which means that passenger comfort is key. It is known that allowing a seat occupant to move or change position can result in them feeling more comfortable. This is particularly true in transportation situations such as in passenger aircraft where the occupant is seated for extended periods while confined within a limited space.

One way to allow the occupant to change position is to make the seat back movable relative to the remainder of the seat. This has been typically achieved by incorporating mechanisms into the seat structure that create an articulation between the bottom and back structural elements. Some articulating seats only change the included angle between the seat back and seat bottom, while some articulating seats also position the seat bottom more forward of the seat back as the articulation takes place.

Articulating seats can provide the occupant more postural options but there are limitations and disadvantages to the foregoing methods of articulation. A limitation of that type of articulation arrangement is that the components are specific to certain seat designs and are not readily added to existing seats of a different design. Another disadvantage is a lack of lumbar support adjustment in accordance with the position of the seat bottom. Additionally, the main structural parts of articulating seats typically need to be more complex and robust than those of non-articulating seats, adding significantly to the cost of the seat.

One particular challenge is to provide for movement of a passenger seat between upright and reclined positions, without intruding the passenger seat into another passenger's space. Such variation of posture is very helpful in maintaining passenger comfort during a long distance trip. Yet a fully reclined seat occupies much greater horizontal space than does a fully upright seat. It would be advantageous to provide a seat that can provide the benefits of a reclined position, within a smaller horizontal space than previously achievable.

SUMMARY OF THE INVENTION

According to the present invention, a seat occupant can change position by sliding a bottom seat cushion or padding forward or rearward as needed to relieve discomfort associated with sitting in a stationary position.

The invention provides a way to add forward and rearward motion to existing seats that do not articulate or have other means by which the relative position of the back and bottom structure can be altered by the occupant.

The invention also provides a simple way to implement, in articulating seats, a lumbar support that varies in conjunction with the position of the seat bottom.

The invention can also be used as a lower cost way to incorporate movement features into new seat designs without the need for costly articulating structural elements.

According to an embodiment of the present invention, a movable seating arrangement includes a seat frame in combination with a seat member and a lumbar support. The seat frame includes a seat pan and a back support. The seat member is slidingly mounted to the seat pan, and is movable between a retracted position proximate the back support and an extended position displaced forward from the upright position. In its retracted position, the seat member can support an occupant in a generally upright posture against the back support. In its extended position, the seat member can support the occupant in a generally reclined posture against the back support.

In certain embodiments, the seat member is connected with a lumbar support, and the lumbar support is mounted to the back support, such that motion of the seat member from its retracted position to its extended position causes a mid portion of the lumbar support to flex from a flattened position against the back support to a protruding position. Thus, the lumbar support aids in supporting the occupant in the generally reclined posture.

In other embodiments, a movable seating arrangement includes a seat frame and a seat member slidably mounted on the seat frame. The seat frame includes an upright back portion and a horizontal pan portion. The seat member is slidably mounted on the pan portion of the seat frame and is movable between a retracted position proximate the back portion and an extended position distal from the back portion. The seating arrangement also includes a lumbar support mounted to the seat frame and movable between a retracted position against the back portion of the seat pan and an extended position away from the back portion. The lumbar support is connected with the movable seat member to move jointly between the retracted and extended positions.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 1 is a front perspective view of a movable seating arrangement in a retracted position for an upright posture, according to a first embodiment of the present invention.

FIG. 2 is a rear perspective view of the movable seating arrangement in its retracted position.

DETAILED DESCRIPTION OF THE INVENTION

Figure 3:
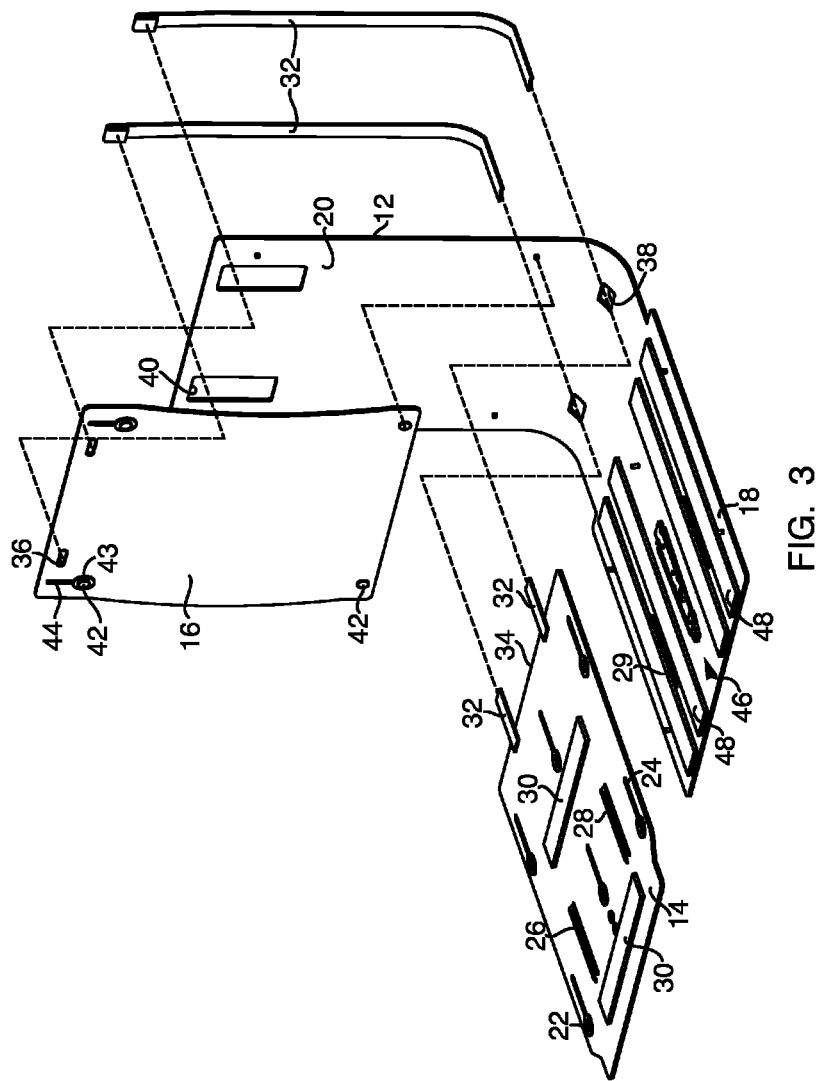
FIG. 3 is an exploded view of the movable seating arrangement.

Referring to FIGS. 1 and 2, in embodiments of the invention, a movable seating arrangement 10 includes a seat frame 12 to which are mounted a seat member 14 and a lumbar support 16. The seat frame includes a seat pan 18 and a back support 20. In certain embodiments, as shown, the seat pan 18 and the back support 20 are integrally formed parts of the seat frame 12.

The seat member 14 is slidably mounted to the seat pan 18 by some form of rail arrangement. In example, FIGS. 1 and 2 show fasteners such as rivets 22, which extend from the seat pan through slots 24 that are formed in the seat member. Alternatively, grooved slides, rollers, extension rods, or other types of linear guides may be used to provide for sliding motion of the seat member 14 between a retracted position (wherein the seat member overlies the seat pan 18 with a rearward edge of the seat member proximate the back support 20) for supporting an occupant in an upright posture, and an extended position (wherein the rearward edge of the seat member is displaced forward from the back support 20) for supporting an occupant in a reclined posture.

Compression coil springs 26 are captured in slots 28, 29 (shown in FIG. 3) that are formed in the seat member 14 and in the seat pan 18 respectively. The compression springs 26 are provided as bias members for holding the seat member 14 toward its retracted position overlying the seat pan 18, as shown in FIG. 1. A cushion or seat pad (not shown) can be removably fastened to the seat member 14 by gripping surfaces 30 (e.g., hook and loop fasteners or adhesive tape).

In embodiments, the seat member 14 is movably attached to the lumbar support 16. For example, the seat member 14 is attached to an upper portion 36 of the lumbar support by straps 32 that extend from a rearward edge 34 of the seat member through openings 38, 40 formed in lower and upper portions of the back support 20. Thus, for most of their length, the straps 32 run across a rearward surface of the back support 20. The upper openings 40 are elongated to permit downward motion of the lumbar support 16, as further discussed with reference to FIGS. 3 and 4.

At a lower portion, the lumbar support 16 is fixed to the back support 20, for example, by rivets 42. Normally, the lumbar support 16 rests against the back support 20 in a flattened position.

At its upper portion 36, the lumbar support 16 is slidingly connected to the back support 20. For example, the upper portion 36 of the lumbar support 16 can be slidingly connected to the back support 20 by rivets 42 that protrude through slots 44 formed in the lumbar support, as shown in FIGS. 1 and 2. These sliding rivets carry washers 43 for holding the lumbar support against the back support. Alternatively, the lumbar support 16 can be connected to the back support 20 by various other rail arrangements that permit at least a mid portion of the lumbar support to flex away from the back support while holding the upper and lower portions of the lumbar support against the back support.

FIG. 3 shows the movable seating arrangement 10 in an exploded view. This exploded view reveals a detent 46 for releasably locking the seat member 14 in either the retracted position or the extended position. Also visible are friction reducing members 48 for supporting relative sliding motion of the seat member 14 on the seat pan 18. When desired, an occupant can exert a force to overcome the detent 46 and to move the seat member 14 forward to its extended position. The occupant can move the cushion from its extended position back to its retracted position along the same path until the detent 46 engages to retain it. In certain embodiments, the seat member 14 slides on top of the friction reducing strips 48, guided by the rivets 22 passing through the slots 24, and opposed or aided by the springs 26 within the slots 28, 29.

The seat frame 12 and the seat member 14 can be made of various rigid or semi-rigid plastics; some examples are ABS/PVC, polypropylene and PVC/Acrylic alloy. The friction reducing members 48 also can be made of plastic, typically nylon 6/6 or UHMW polyethylene. A combination is selected that mates dissimilar materials resulting in a lowered frictional load. In certain embodiments, the seat frame and seat member materials are chosen to provide an assembly that still is able to move even while the assembly is bent. This ability allows the assembly be used on flexible diaphragm structures as well as rigid seat pans. Alternatively, when made of thin sheets of relatively stiff material, embodiments of the invention can make a diaphragm type seat structure more supportive by lessening the distortion of the diaphragm caused by the weight of the seat occupant.

Figure 5:
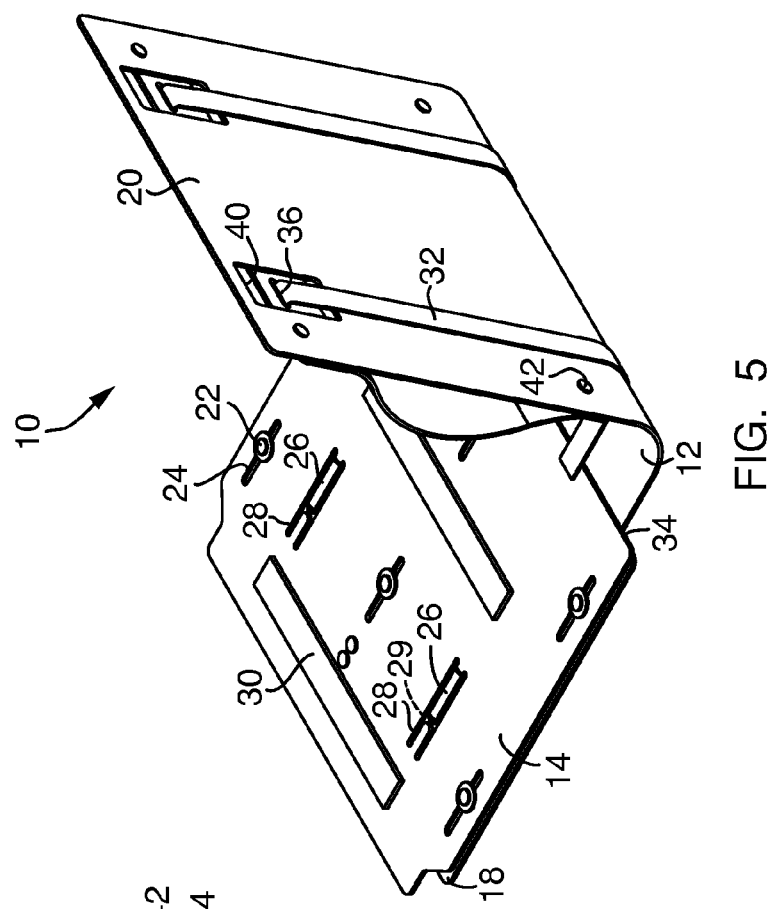
FIG. 5 is a rear perspective view of the movable seating arrangement in its extended position.
Figure 4:
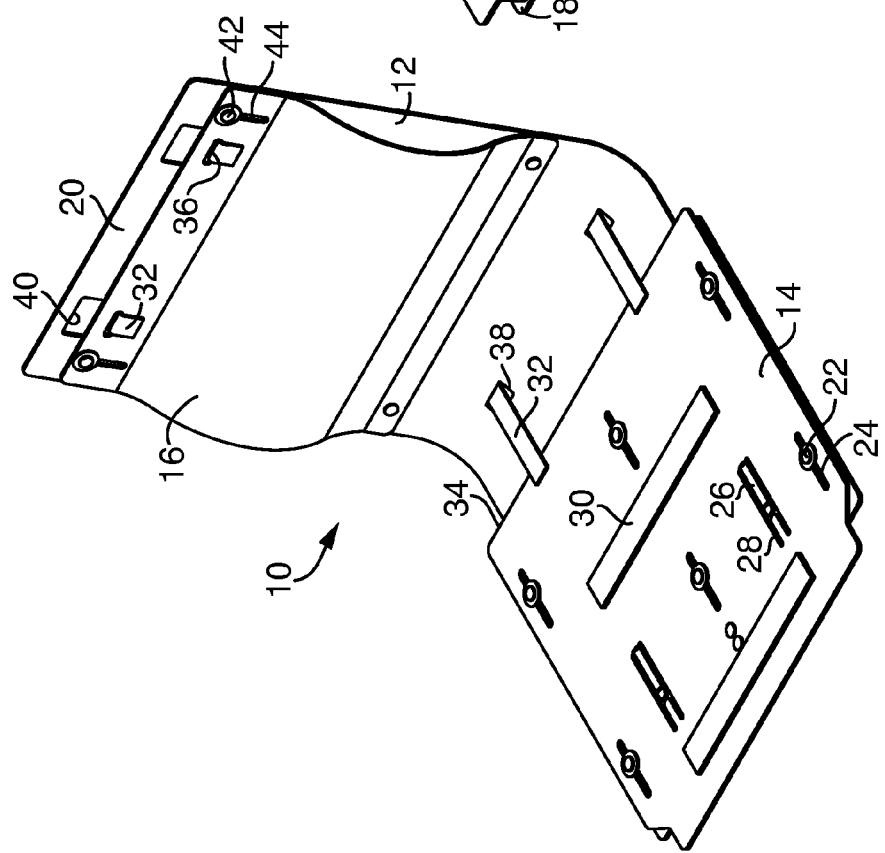
FIG. 4 is a front perspective view of the movable seating arrangement in an extended position for a reclined posture.

Referring to FIGS. 4 and 5, the seat member 14 is movable to an extended position displaced forward from the seat pan 18. When the seat member 14 is displaced forward, the straps 32 pull down at the upper portion 36 of the lumbar support 16, causing the lumbar support to flex into a bowed condition where the lumbar support stands away from the back support 20. Forward motion of the seat member 14 is limited by the rivets 22 within the slots 24 and by the springs 26 within the slots 28, while outward motion of the lumbar support 16 is limited by the rivets 42 within the slots 44. When the seat member 14 is returned rearward to its retracted position, either by the springs 26 or by motion of an occupant, the lumbar support 16 elastically returns to its flattened condition.

Figure 6:
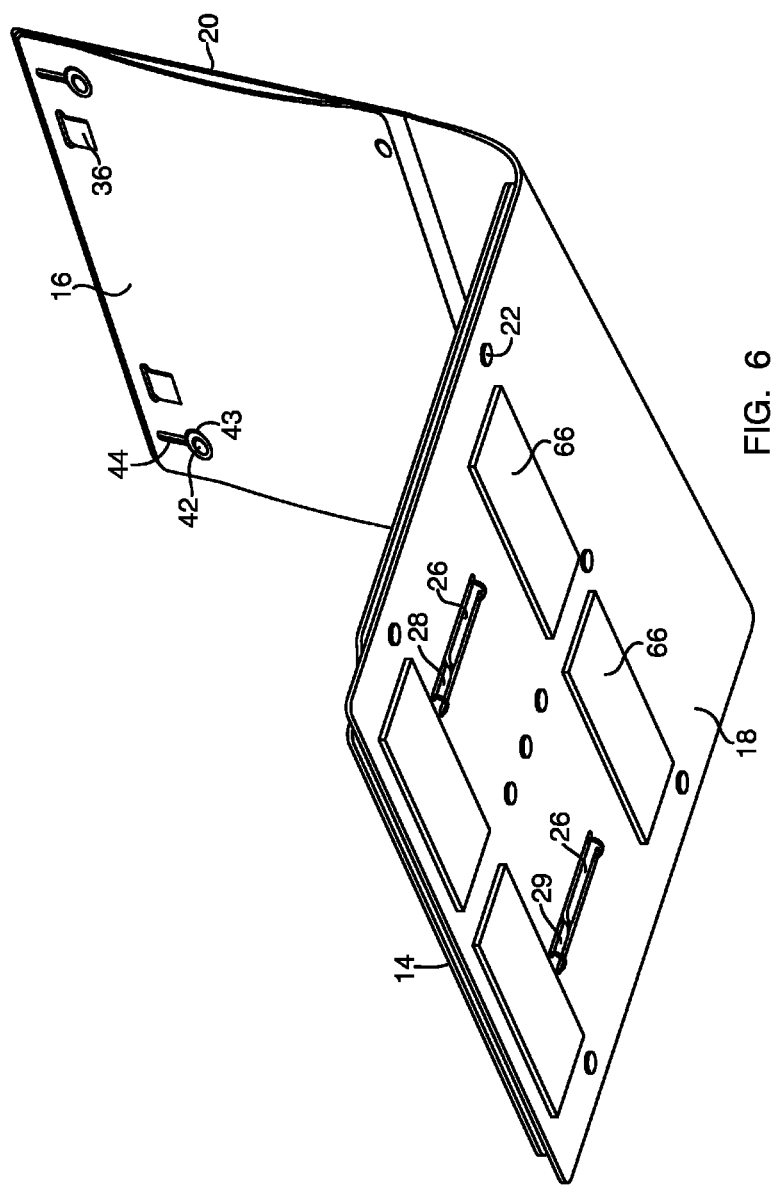
FIG. 6 is a bottom perspective view of the movable seating arrangement in its retracted position.
Figure 7:
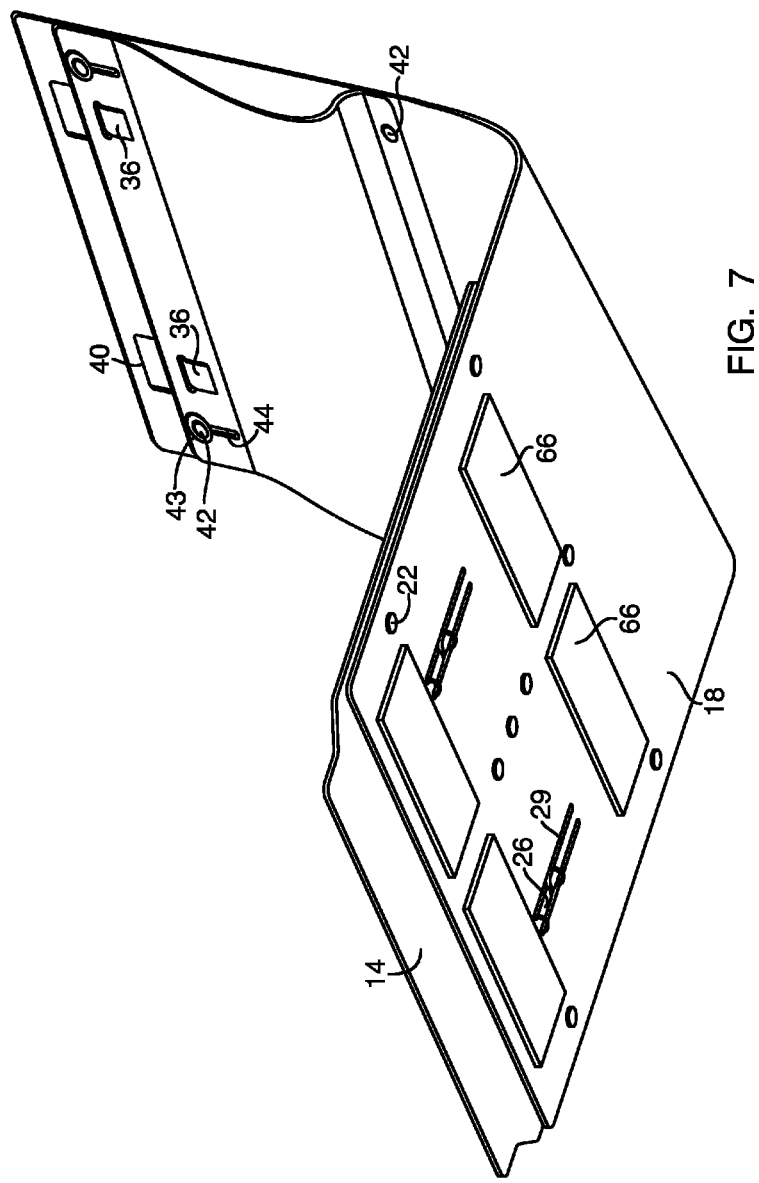
FIG. 7 is a bottom perspective view of the movable seating arrangement in its extended position.

FIGS. 6 and 7 show bottom perspective views of the movable seating arrangement 10. The movable seating arrangement 10 may include hook and loop fastener strips, adhesive strips, or similar means 66 for mounting the arrangement to an underlying support (not shown), such as a structure of a pre-existing seat.

Figure 8:
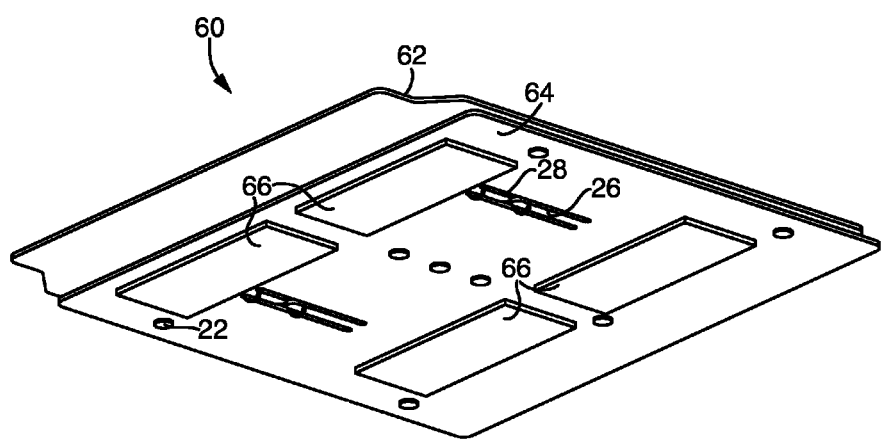
FIG. 8 is a bottom perspective view of a retrofit movable seating arrangement, according to a second embodiment of the present invention.

FIG. 8 shows a bottom perspective view of a retrofit movable seating arrangement 60, which includes a seat member 62 and a seat pan 64. Other components, similarly numbered to those in FIGS. 1-5, are generally as described above. At a lower surface of the seat pan 64, hook and loop fastener strips, adhesive strips, or similar means 66 are provided for mounting the seat pan to an underlying support (not shown), such as a structure of a pre-existing seat. In essence, the embodiment shown by FIG. 8 differs from the embodiment of FIGS. 1-7 by omission of the back support 20 and of the lumbar support 16. Thus, the retrofit movable seating arrangement 60 can be mounted onto an existing non-reclining seat to provide for fully-supported forward and rearward motion of an occupant upon the seat member 62. Alternatively, embodiments of the invention can be installed into a seat cushion or seat padding.

Although this invention has been shown and described with respect to the detailed embodiments thereof, it will be understood by those skilled in the art that various changes in form and detail thereof may be made without departing from the spirit and the scope of the invention, which is defined by the appended claims.

What is claimed is:

1. A movable seating arrangement comprising:
   a seat pan;
   a back support attached to the seat pan;
   a seat member slidably mounted to a back-support-adjacent surface of the seat pan;
   wherein the seat member is movable from a retracted position proximate the back support wherein the seat member in its retracted position supports an occupant in a generally upright posture against the back support, to an extended position displaced forward of the retracted position wherein the seat member in its extended position supports the occupant in a generally reclined posture against the back support, without imposing movement of any portion of the seating arrangement to any position rearward of the upright back support; and at a surface of the seat pan opposite the seat member, means for mounting said arrangement to a structure of a pre-existing seat.

2. A movable seating arrangement as claimed in claim 1, further comprising at least one bias member provided between the seat member and the seat pan for holding the seat member toward the retracted position.

3. A movable seating arrangement as claimed in claim 1, further comprising:
a lumbar support having a lower portion fixedly mounted to the back support, an upper portion movably connected to the back support, and a flexible mid portion, wherein the seat member is movably connected to the upper portion of the lumbar support, such that movement of the seat member to its extended position causes the mid portion of the lumbar support to flex forward from the back support.

4. A movable seating arrangement as claimed in claim 3, wherein the seat member is movably connected to the upper portion of the lumbar support by straps that extend through slots formed in the back support.

5. A movable seating arrangement as claimed in claim 1, further comprising a detent for releasably holding the seat member in its retracted position or in its extended position.

6. A movable seating arrangement comprising:
a seat pan;
a back support attached to the seat pan;
a seat member slidably mounted to a back-support-adjacent surface of the seat pan, wherein the seat member is movable from a retracted position proximate the back support to an extended position displaced forward of the retracted position;
at a surface of the seat pan opposite the seat member, means for mounting said arrangement to a structure of a pre-existing seat; and
a lumbar support having a first portion fixedly connected to the seat pan and having a second portion movably connected to the seat member, wherein movement of the seat member to its extended position causes the lumbar support to bow forward at a middle portion thereof.

7. A movable seating arrangement comprising:
a seat pan;
a seat member slidably mounted on the seat pan and movable between a retracted position overlying the seat pan and an extended position partly overlying the seat pan at a forward edge thereof; and
a lumbar support having a lower portion fixedly connected with the seat pan, an upper portion movably connected with the seat member, and a flexible mid portion, wherein motion of the seat member to its extended position causes the mid portion of the lumbar support to flex forward from a flattened position.

8. A movable seating arrangement as claimed in claim 7, further comprising a back support extending upward from a rearward edge of the seat pan and supporting the upper portion of the lumbar support.

9. A movable seating arrangement as claimed in claim 8, the lumbar support being movably attached to the back support.

10. A movable seating arrangement as claimed in claim 8, the upper portion of the lumbar support being slidably fastened to the back support.

11. A movable seating arrangement as claimed in claim 8, the upper portion of the lumbar support being connected by straps to the seat member, said straps extending through slots formed in the back support.

12. A movable seating arrangement as claimed in claim 7, further comprising: friction reducing members interposed between the seat member and the seat pan; and
fasteners protruding from one of the seat member or the seat pan through slots formed in the other of the seat member and the seat pan.

13. A movable seating arrangement as claimed in claim 7, further comprising a detent for releasably holding the seat member in its retracted position or in its extended position.

14. A movable seating arrangement as claimed in claim 7, further comprising means for mounting the seat pan to a fixed structure.

15. A movable seating arrangement as claimed in claim 7, further comprising at least one bias member provided between the seat member and the seat pan for holding the seat member toward the retracted position.

16. A movable seating arrangement as claimed in claim 7, wherein while the mid portion of the lumbar support is flexed forward, the lumbar support exerts restoring force toward its flattened position.

17. A movable seating arrangement as claimed in claim 16, wherein motion of the seat member to its retracted position releases the mid portion of the lumbar support to its flattened position.

18. A movable seating arrangement comprising:
a seat pan configured for attachment to a pre-existing seat structure, with a rearward edge of the seat pan adjacent a back support portion of the pre-existing seat structure;
a seat member slidably mounted on the seat pan and movable between a retracted position overlying the seat pan and an extended position partly overlying the seat pan at a forward edge thereof, wherein the seat member in its retracted position supports an occupant in a generally upright posture against the back support portion and wherein the seat member in its extended position supports the occupant in a generally reclined posture against the back support portion, whereby, while the seat pan is attached to the pre-existing seat structure, an occupant can move the seat member between retracted and extended positions without moving any portion of the seating arrangement to any position rearward of the upright back support portion of the pre-existing seat structure; and
at a surface of the seat pan opposite the seat member, means for mounting said arrangement to the pre-existing seat structure.

19. A movable seating arrangement comprising:
a seat frame including an upright back portion and a horizontal pan portion;
a seat member slidably mounted on the pan portion of the seat frame and movable between a retracted position proximate the back portion and an extended position distal from the back portion, without imposing rearward movement of any portion of the seating arrangement to any position rearward of the upright back portion, wherein the seat member in its retracted position supports an occupant in a generally upright posture against the back portion and the seat member in its extended position supports the occupant in a generally reclined posture against the back portion;
a lumbar support mounted to the seat frame and movable between a retracted position against the back portion of the seat pan and an extended position away from the back portion, wherein the lumbar support is connected with the seat member to move jointly between the retracted and extended positions; and at a surface of the pan portion opposite the seat member, means for mounting said arrangement to a structure of a pre-existing seat.

\* \* \* \* \*